(12) United States Patent
Seok

(10) Patent No.: US 10,632,947 B2
(45) Date of Patent: Apr. 28, 2020

(54) REAR GUARD STRUCTURE SYSTEM

(71) Applicant: E-cube System Inc., Ansan-si (KR)

(72) Inventor: Jee Ung Seok, Gimpo-si (KR)

(73) Assignee: E-CUBE SYSTEM INC., Gyeonggi-Do, Ansan-si (KR)

( * ) Notice: Subject to any disclaimer, the term of this patent is extended or adjusted under 35 U.S.C. 154(b) by 69 days.

(21) Appl. No.: 15/906,441

(22) Filed: Feb. 27, 2018

(65) Prior Publication Data
US 2018/0272972 A1   Sep. 27, 2018

(30) Foreign Application Priority Data

Mar. 23, 2017 (KR) .......................... 10-2017-0036553

(51) Int. Cl.
| | |
|---|---|
| *B60R 19/56* | (2006.01) |
| *B60R 19/30* | (2006.01) |
| *B60R 19/38* | (2006.01) |
| *B60R 19/32* | (2006.01) |

(52) U.S. Cl.
CPC .............. *B60R 19/56* (2013.01); *B60R 19/30* (2013.01); *B60R 19/32* (2013.01); *B60R 19/38* (2013.01)

(58) Field of Classification Search
CPC ......... B60R 19/38; B60R 19/32; B60R 19/30; B60R 19/56
USPC ........................................................ 293/118
See application file for complete search history.

(56) References Cited

U.S. PATENT DOCUMENTS

| | | | | |
|---|---|---|---|---|
| 4,988,258 A | * | 1/1991 | Lutz ....................... | B60R 19/56 293/118 |
| 6,109,675 A | * | 8/2000 | Sumrall .................. | B60R 19/56 293/117 |
| 2015/0258951 A1 | * | 9/2015 | Wylezinski ........... | B60R 19/023 293/102 |

* cited by examiner

*Primary Examiner* — Joseph D. Pape
*Assistant Examiner* — Dana D Ivey
(74) *Attorney, Agent, or Firm* — Cantor Colburn LLP

(57) ABSTRACT

Provided is a rear guard structure system including: a chassis frame attached to the bottom of a vehicle; a plurality of guard stays having one ends hinge-coupled to chassis-frame hinges at both sides of the chassis frame through first hinges; and a rear guard attached to the other ends of the guard stays. A first stopper is mounted around the first hinge so as to restrict rotation of the guard stay, and includes a first buffer member to reduce shock or vibration when the rear guard is vertically vibrated.

16 Claims, 21 Drawing Sheets

REAR GUARD STRUCTURE SYSTEM

TECHNICAL FIELD

The present invention relates to a rear guard structure system, and more particularly, to a rear guard structure system for preventing a car from sliding under a cargo box of a truck when the car collides with a rear end of the truck.

BACKGROUND ART

In general, a truck not only has a larger weight or size than a car, but also has a larger height than a car. Thus, when a car collides with the rear end of a truck, the car may slide under the cargo box of the truck, thereby causing a fatal accident. Therefore, as illustrated in FIGS. 1 and 2, a heavy goods vehicle such as a truck is required to have a rear guard 1 installed at the rear thereof.

The rear guard 1 serves to prevent a small vehicle from sliding under a truck, when the small vehicle collides with the rear end of the truck. As illustrated in FIG. 3, the rear guard 1 is fixed to a guard stay 2. Typically, the guard stay 2 has a bracket structure formed by pressing a steel plate. The guard stay 2 is attached to a rear chassis frame 3 of a truck. Furthermore, the rear guard 1 is made of a rectangular or circular steel pipe, and attached to one ends of both guard stays 2.

In a general car, the front bumper is installed between 250±50 mm and 450±50 mm from the ground. At this time, 250±50 mm indicates a height from the ground to the bottom of the bumper, and 450±50 mm indicates a height from the ground surface to the top of the bumper. Moreover, the rear bumper is installed between 300±50 mm and 500±50 mm from the ground. At this time, 300±50 mm indicates a height from the ground to the bottom of the bumper, and 500±50 mm indicates a height from the ground surface to the top of the bumper. Therefore, although a car collides with another car, the car in the rear does hardly slide under the car in the front. In the case of a truck, however, the rear guard 1 is installed between 550 mm and 650 mm from the ground. At this time, 550 mm indicates a height from the ground to the bottom of the rear guard 1, and 650 mm indicates a height from the ground to the top of the rear guard 1. Therefore, when a car rear-end collides with the truck in front, the car may slide under the truck, thereby causing a fatal accident.

In order to solve such a problem, a structure may be considered, in which the rear guard 1 of the truck is installed at the bumper level of a car. In this case, as illustrated in FIG. 1, a truck having a short distance from a rear wheel to the rear end of the cargo box has no trouble in moving up or down a steep access road, because an angle θ1 between the ground and a line connecting the rear wheel of the truck to the bottom of the rear guard is large. As illustrated in FIG. 2, however, a truck having a long distance from a rear wheel to the rear end of the cargo box has a structure in which the cargo box protrudes to the rear further than that of the truck of FIG. 1. Thus, such a truck has a small angle θ2 between the ground and a line connecting the rear wheel to the bottom of the rear guard. Therefore, when the truck moves up or down a steep access road, the rear guard 1 may be damaged while coming in contact with the ground. Accordingly, in the truck of which the cargo box significantly protrudes to the rear, the rear guard 1 cannot be installed at a low height.

In other words, the truck having a long distance from the rear wheel to the rear end of the car box has a problem in that the rear guard cannot be installed at a low height from the ground because the rear guard is damaged by contact with the ground when the truck moves up or down a steep access road. Besides, when the rear guard is not installed at a position which is sufficiently close to the ground due to the constraint condition of the truck, a car in the rear may slide under the truck in the case where the car collides with the rear end of the truck. In this case, the rear guard may not play its role.

SUMMARY OF THE INVENTION

Technical Problem

The invention has been made to solve the above-described problem, and an object thereof is to provide a rear guard structure system capable of driving a truck, which has a long distance from a rear wheel to a rear end of a car box, up or down a steep access road without damaging the rear guard even when a lower part of the rear guard comes in contact with the ground, and preventing a car from sliding under the cargo box of the truck at the time of collision by installing the rear guard at a position sufficiently close to the ground.

Solution to Problem

In order to achieve the object, a rear guard structure system according to a first aspect of the invention, includes: a chassis frame attached to the bottom of a vehicle; a plurality of guard stays having one ends hinge-coupled to chassis-frame hinges at both sides of the chassis frame through first hinges; and a rear guard attached to the other ends of the guard stays.

In the rear guard structure system according to the invention, a first stopper is mounted around the first hinge so as to restrict rotation of the guard stay.

In the rear guard structure system according to the invention, the first stopper includes a first buffer member to reduce shock or vibration when the rear guard is vertically vibrated.

In the rear guard structure system according to the invention, when the rear guard is attached to the other ends of the guard stays, a face of the rear guard has an angle of 90 degrees or more with respect to the ground.

The rear guard structure system according to the invention further includes a first stay link having one end connected to the rear guard through a second hinge and the other end connected to the chassis frame through a third hinge, wherein the rear guard is hinge-coupled to the other end of the guard stay through a fourth hinge, and a face angle of the guard stay is constantly maintained or adjusted to a desired angle, depending on the length of the first stay link or the hinge positions of both ends of the first stay link.

The rear guard structure system according to the invention further includes a wheel or sliding member mounted on the rear guard or the guard stay, in order to prevent damage caused by friction when the rear guard comes in contact with the ground.

In the rear guard structure system according to the invention, the guard stay has a second stopper protruding from a predetermined region thereof in parallel to the chassis frame, and the second stopper includes a second buffer member for reducing friction with the chassis frame.

In the rear guard structure system according to the invention, the guard stay is bent toward the front of the vehicle.

The rear guard structure system according to the invention further includes a third stopper installed on the chassis frame, the third stopper having a third buffer member for restricting rotation of the guard stay.

In the rear guard structure system according to the invention, the guard stay has a fourth stopper protruding from a predetermined region thereof in parallel to the chassis frame, and the fourth stopper includes a fourth buffer member for reducing friction with the chassis frame.

The rear guard structure system according to the invention further includes a sliding link having one end hinge-coupled to the chassis frame and the other end connected to the guard stay through a sliding pin, wherein the sliding link has a first sliding guide installed at the other end thereof, the first sliding guide serving to guide the sliding pin, and the first sliding guide has a fifth buffer member installed in one side thereof, the fifth buffer member serving to restrict sliding of the sliding pin.

The rear guard structure system according to the invention further includes: a circular or polygonal first ring connected through a side portion of the chassis frame, while surrounding the guard stay, wherein the first ring is formed of an elastic material which is elastically deformed in the direction of weight; or a fifth stopper having a sixth buffer member installed at a portion of the first ring, which comes in contact with the guard stay.

In the rear guard structure system according to the invention, the guard stay includes a shock absorbing member installed therein so as to absorb shock.

In the rear guard structure system according to the invention, the guard stay includes a shock absorbing member installed at the face thereof so as to absorb shock.

A rear guard structure system according to a second aspect of the invention includes a chassis frame attached to the bottom of a vehicle, a plurality of hinge brackets having one ends hinge-coupled to both sides of the chassis frame and the other ends hinge-coupled through fifth hinges, a plurality of guard stays having sixth hinges installed at one ends thereof, the sixth hinges being coupled to the fifth hinges installed at the other ends of the hinge brackets and a rear guard attached to the other ends of the guard stays.

The rear guard structure system according to the invention further includes an L-shaped sixth stopper having one end hinge-coupled to the other end of the hinge bracket through the fifth and sixth hinges, wherein the sixth stopper serves to restrict rotation of the guard stay and includes a seventh buffer member installed at the other end thereof, the seventh buffer member serving to reduce shock and vibration when the rear guard is vertically vibrated.

The rear guard structure system according to the invention further includes a second stay link having one end connected to the rear guard through a seventh hinge and the other end connected to the hinge bracket through an eighth hinge, wherein the rear guard is hinge-coupled to the other end of the guard stay through a ninth hinge, and the face of the rear guard can be constantly maintained or adjusted to a desired angle, depending on the length of the second stay link or the hinge positions of both ends of the second stay link.

The rear guard structure system according to the invention further includes a first piston stopper having one end coupled to the chassis frame and the other end connected to the guard stay through a piston, wherein the first piston stopper has a second sliding guide formed at the other end thereof, the second sliding guide serving to guide a piston operation of the piston, and the second sliding guide includes a damper fluid to fill the inside thereof.

The rear guard structure system according to the invention further includes a third stay link and a fourth stay link, the third stay link having one end hinge-coupled to the chassis frame, and the fourth stay link having one end hinge-coupled to the guard stay and the bent other end, wherein the other end of the third stay link is hinge-coupled to the fourth stay link through a tenth hinge, such that a rotation angle between the third and fourth stay links based on an upward/downward movement of the rear guard is larger than a rotation angle between the guard stay and the fourth stay link, and between the other end of the fourth stay link and the third stay link, an eighth buffer member is installed.

The rear guard structure system according to the invention further includes a second ring formed in a circular or polygonal shape, the second ring being connected through a side portion of the chassis frame while surrounding the guard stay, wherein the second ring is formed of an elastic member which can be elastically deformed in the direction of weight, or has a ninth buffer member installed at a portion of the second ring, which comes in contact with the guard stay, or a buffer ring inserted into the portion of the second ring, which comes in contact with the guard stay.

Preferably, the rear guard structure system according to the invention may have a structure in which the chassis frame and the guard stay are connected through a wire or chain.

Preferably, in the rear guard structure system according to the invention, the guard stay may further include a shock absorbing member capable of absorbing shock.

A rear guard structure system according to a third aspect of the invention includes a chassis frame attached to the bottom of a vehicle, a plurality of hinge brackets having one ends coupled to both sides of the chassis frame and the bent other ends, a plurality of guard stays having one ends hinge-coupled to straight portions of the hinge brackets through eleventh hinges, and a rear guard attached to the other ends of the guard stays, wherein a tenth buffer member is installed between the guard stay and the other end of the hinge bracket.

The rear guard structure system according to the invention further include a second piston stopper having one end coupled to the chassis frame and the other end coupled to the rear guard through a piston.

The structure system of the rear guard according to the invention further includes an elastic member between the one end of the second piston stopper and the piston.

The rear guard structure system according to the invention further includes a power-driven device or hydraulic device installed between the one end of the second piston stopper and the piston, and raises or lowers the piston, if necessary.

The rear guard structure system according to the invention further includes a first distance sensor installed at the other end of the second piston stopper and configured to measure a distance to the ground, such that the piston is automatically raised when the rear guard is close to the ground.

The rear guard structure system according to the invention further includes a third piston stopper having one end coupled to the chassis frame and the other end connected to the guard stay through a piston, wherein the third piston stopper has a third sliding guide installed at the other end thereof so as to guide a piston operation of the piston, and the third sliding guide is filled with air or damper fluid.

The rear guard structure system according to the invention further includes an elastic member installed in the third sliding guide.

The rear guard structure system according to the invention further includes a power-driven device or hydraulic device installed in the third sliding guide, and configured to raise or lower the piston, if necessary.

The rear guard structure system according to the invention further includes a second distance sensor installed at the other end of the third piston stopper and configured to measure a distance to the ground, such that the piston is automatically raised when the rear guard is close to the ground.

The rear guard structure system according to the invention further includes a second sliding guide having an elastic member installed therein.

Preferably, in the rear guard structure system according to the invention, the second sliding guide further includes a power-driven device or hydraulic device to raise or lower the piston, if necessary.

The rear guard structure system according to the invention further includes a third distance sensor installed at the other end of a fourth piston stopper and configured to measure a distance to the ground, such that the piston is automatically raised when the rear guard is close to the ground.

Advantageous Effects of the Invention

According to the invention, it is possible to provide a rear guard structure system capable of driving a truck, which has a long distance from a rear wheel to a rear end of a car box, up or down a steep access road without damaging the rear guard even when a lower part of the rear guard comes in contact with the ground, and to prevent a car from sliding under the cargo box of the truck at the time of collision by installing the rear guard at a position sufficiently close to the ground.

DESCRIPTION OF EMBODIMENTS

The present invention may be modified in various manners and have a variety of embodiments. Therefore, specific embodiments will be described in detail with reference to the accompanying drawings. However, the present invention is not limited to the specific embodiments, and may include all variations, equivalents and substitutes within the scope of the present invention. Moreover, detailed descriptions related to well-known functions or configurations will be ruled out in order not to unnecessarily obscure subject matters of the present invention.

The terms such as first and second may be used to describe various components, but the components should not be limited by the terms. The terms are used only to distinguish one component from another component.

The terms used in this specification are used only to describe a specific embodiment, but not intended to limit the present invention. The terms of a singular form may include plural forms unless referred to the contrary. In this specification, the meaning of "include" or "have" specifies a property, a number, a step, a process, a component, a part or combinations thereof, but does not exclude one or more other properties, numbers, steps, processes, components, parts or combinations thereof.

Moreover, detailed descriptions related to publicly known functions or configurations will be ruled out in order not to unnecessarily obscure subject matters of the present invention.

Hereafter, exemplary embodiments of the present invention will be described in detail with reference to the accompanying drawings.

Figure 1:
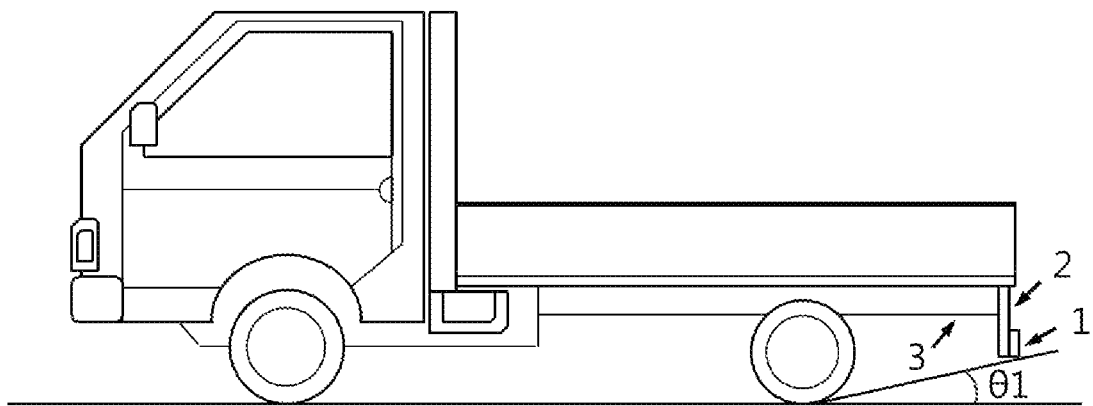
FIG. 1 is a side view of a light truck having a rear guard installed thereon according to the related art.
Figure 2:
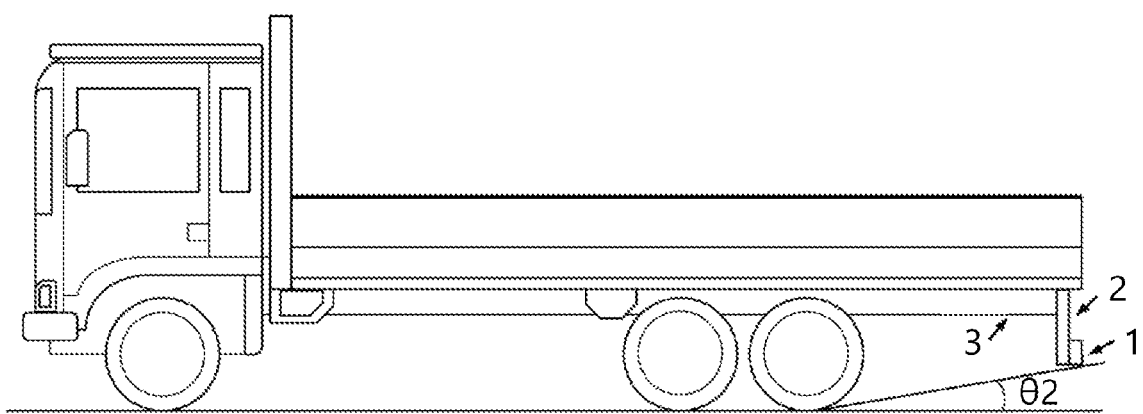
FIG. 2 is a side view of a heavy-duty truck having a rear guard installed thereon according to the related art.
Figure 3:
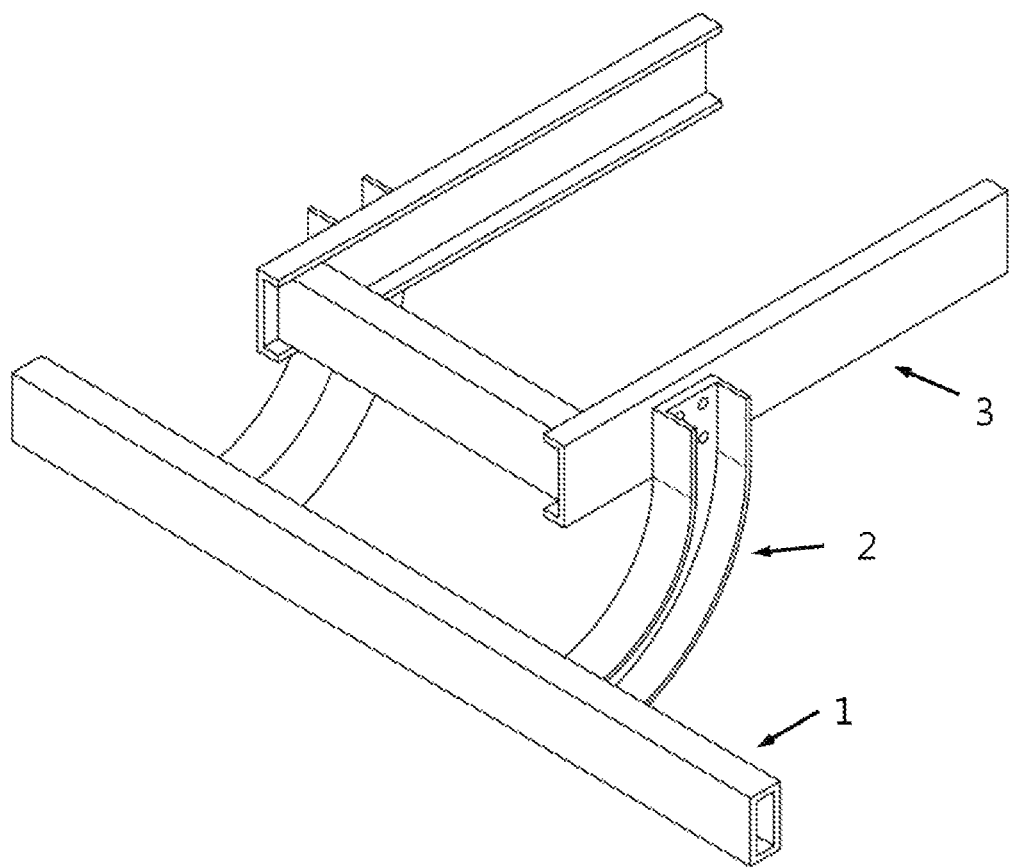
FIG. 3 is a perspective view illustrating a structure in which a rear guard is installed on a rear chassis frame of the truck according to the related art.

FIG. 1 is a side view of a light truck having a rear guard installed thereon according to the related art, FIG. 2 is a side view of a heavy-duty truck having a rear guard installed thereon according to the related art, and FIG. 3 is a perspective view illustrating that a rear guard is installed on a rear chassis frame of each of the trucks according to the related art.

Referring to FIGS. 1 to 3, each of the trucks has a cargo box for carrying freight and a rear guard 1 installed at the bottom of the rear body thereof, the rear guard 1 serving to prevent another vehicle from sliding under the rear body when the vehicle collides with the rear end of the truck. Typically, the rear guard 1 is fixed to the chassis frame 3 by a guard stay 2.

In the case of the heavy-duty truck of which the cargo box considerably protrudes to the rear, the rear guard 1 may be damaged by contact with the ground surface when the truck moves up or down an uphill road. In order to prevent such damage, the rear guard 1 needs to move upward when coming in contact with the ground surface.

Figure 4:
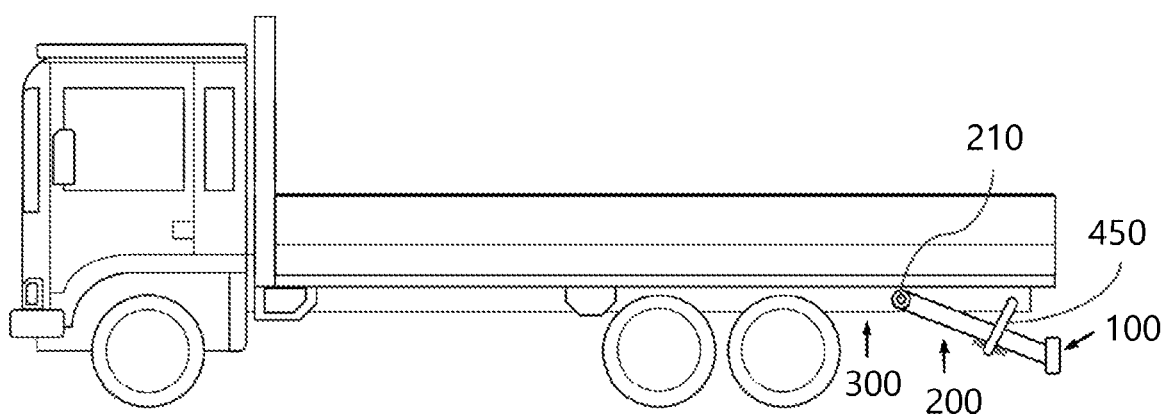
FIG. 4 is a side view of a truck on which a rear guard structure system according to an embodiment of the invention is installed.
Figure 5:
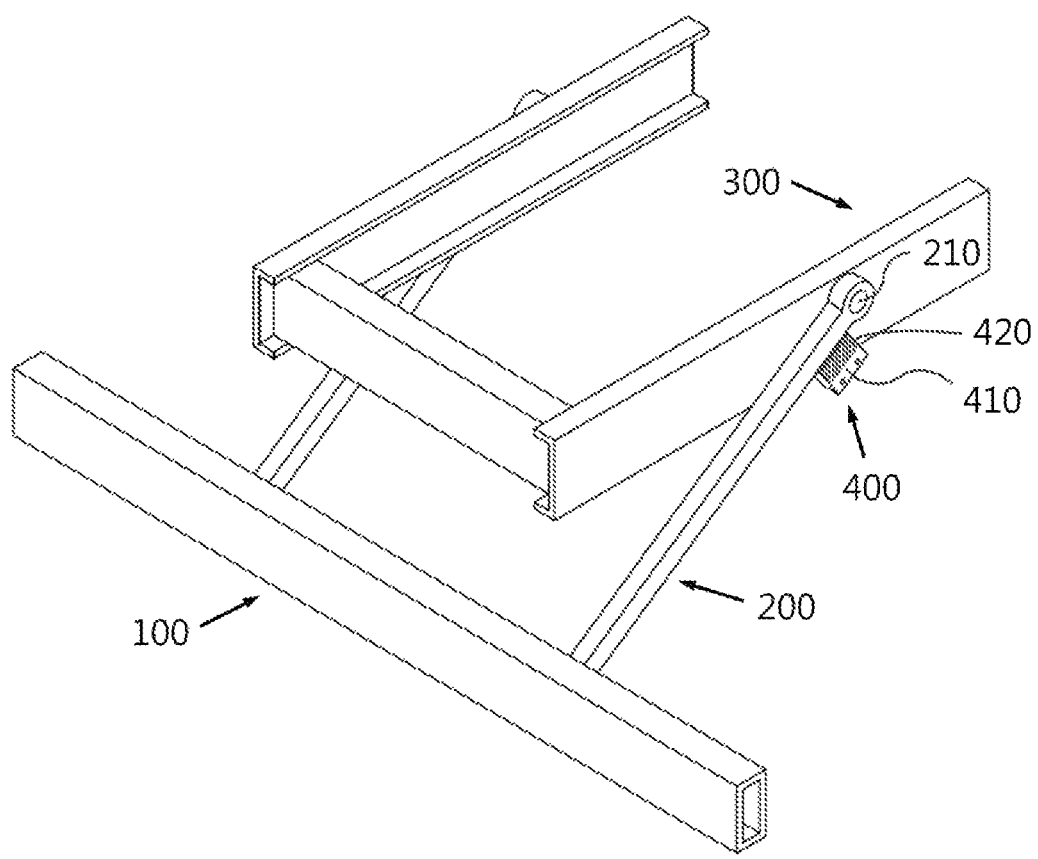
FIG. 5 is a perspective view illustrating a first structure according to a first embodiment, in which the structure system of the rear guard is installed on a chassis frame of the truck.
Figure 6:
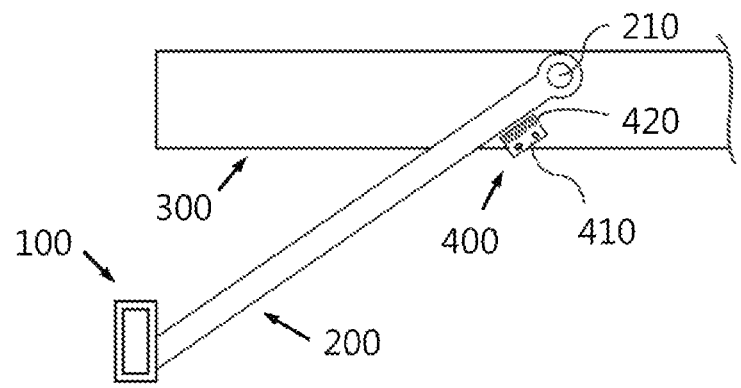
FIG. 6 is a side view illustrating the first structure according to the first embodiment, in which the structure system of the rear guard is installed on the chassis frame of the truck.

FIG. 4 is a side view of a truck on which a rear guard structure system according to an embodiment of the invention is installed, FIG. 5 is a perspective view illustrating a first structure according to a first embodiment, in which the rear guard structure system is installed on a chassis frame of the truck, and FIG. 6 is a side view illustrating the first structure according to the first embodiment, in which the rear guard structure system is installed on the chassis frame of the truck.

Referring to FIGS. 4 to 6, the rear guard structure system according to the present embodiment includes a chassis frame 300, a plurality of guard stays 200 and a rear guard 100. The chassis frame 300 is attached to the bottom of the truck, the plurality of guard stays 200 have one ends coupled to chassis-frame hinges at both sides of the chassis frame 300 through first hinges 210, and the rear guard 100 is attached to the other ends of the guard stays 200.

The rear guard structure system according to the present embodiment has a first stopper 410 mounted around the first hinge 210, the first stopper 410 serving to restrict rotation of the guard stay 200. The first stopper 410 includes a first buffer member 420 that reduces shock and vibration when the rear guard 100 is vertically vibrated.

That is, the guard stays 200 can be rotated about the first hinges 210 of the guard stays 200 located on the chassis frame 300, and the rear guard 100 attached to the guard stays 200 can be rotated and raised. On a flat road, the rear guard 100 is returned to the original position by its weight.

At this time, various shapes of guard stays 200 can be applied. For example, various shapes of stoppers can be applied to stop the rear guard 100 of the truck at the lowest position.

When the rear guard 100 is raised and lowered, a sufficient returning force may not be generated only by its weight. Thus, the rear guard 100 may not be returned to the original position. On the other hand, when the rear guard 100 has an excessively large weight, a great shock may occur while being returned to the original position. In this case, an elastic member such as a spring may be used to increase or decrease the returning force. Moreover, a damper may be used to smoothly operate the rear guard 100.

When a car collides with the rear guard 100, a load is transferred to the guard stay 200, and the shape and magnitude of the load transferred to the guard stay 200 may be changed depending on the shape of the guard stay 200 and the position of the hinge. As a result, stress applied to the guard stay 200 may be changed. Therefore, the stiffness of the guard stay 200 should not exceed such a level that cannot absorb shock, and the guard stay 200 should not be damaged by a small shock. Thus, the guard stay 200 needs to be designed to have proper stiffness. When the guard stay 200 is maintained as horizontally as possible, only a compressive load is applied to the guard stay 200 while a bending load is reduced.

That is, the rear guard 100 is attached to one ends of the guard stays 200 having a predetermined length, the first hinges 210 of the guard stays 200 are positioned at the other ends of the guard stays 200, and the first hinges 210 of the guard stays 200 are attached to the chassis-frame hinges, such that the guard stays 200 can rotate about the hinges. Therefore, although the rear guard 100 comes in contact with the ground when the truck moves up or down an uphill road, the rear guard 100 can be rotated and raised about the hinges. Thus, the rear guard 100 is not damaged. As a result, the rear guard 100 can be installed at a low height, thereby preventing an accident in which a car in the rear slides under the cargo box of the truck when the car collides with the rear end of the truck.

In the embodiment of FIGS. 5 and 6, the first stopper 410 is installed on the chassis frame 300 around the first hinge 210 of the guard stay 200, in order to restrict the rotation of the guard stay 200. The rear guard 100 can be positioned at the lowest point set by the first stopper 410, and operated only upward from the first stopper 410. Moreover, when the rear guard 100 is raised and then lowered or when the rear guard 100 is vertically vibrated while driving, a buffer material or the buffer member 420 for reducing shock and vibration may be installed at the contact portion between the guard stay 200 and the first stopper 410.

Figure 7:
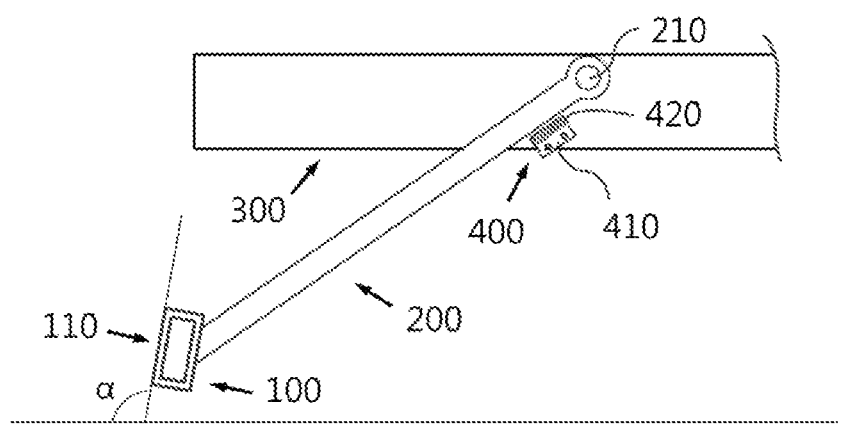
FIG. 7 is a side view illustrating a second structure according to the first embodiment, in which the structure system of the rear guard is installed on the chassis frame of the truck.

FIG. 7 is a side view illustrating a second structure according to the first embodiment, in which the rear guard structure system is installed on the chassis frame of the truck.

Referring to FIG. 7, the rear guard structure system according to the present embodiment has a structure in which a face of the rear guard 100 has an angle α of 90 degrees or more from the ground surface when the rear guard 100 is attached to the other ends of the guard stays 200.

That is, since the rear guard 100 is installed so that the face 110 thereof is inclined, the rear guard 100 can be prevented from being raised when a car collides with the rear end of the truck. When a car collides with the rear end of the truck, the rear guard 100 is likely to be raised. For example, since the rear guard 100 is rotated about the first hinge 210 when being raised, the angle between the face 110 of the rear guard 100 and the ground is changed. In order to prevent the change of the angle, the angle α between the ground and the face 110 of the rear guard 100 at the lowest position in normal operations may be set to 90 degrees or more. Then, the rear guard 100 can be prevented from being raised even though a car collides with the rear end of the truck.

Figure 8:
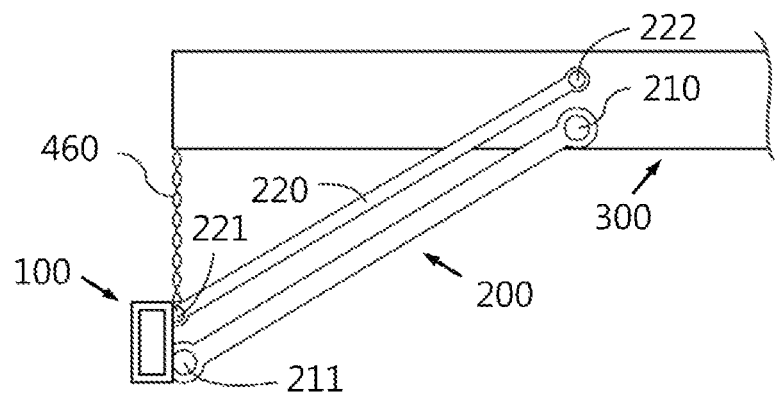
FIG. 8 is a side view illustrating a third structure according to the first embodiment, in which the structure system of the rear guard is installed on the chassis frame of the truck.

FIG. 8 is a side view illustrating a third structure according to the first embodiment, in which the rear guard structure system is installed on the chassis frame of the truck.

Referring to FIG. 8, the rear guard structure system according to the present embodiment further includes a first stay link 220 having one end connected to the rear guard 100 through a second hinge 221 and the other end connected to the chassis frame 300 through a third hinge 222. The rear guard 100 is hinge-coupled to the other end of the guard stay 200 through a fourth hinge 211, and the face 110 of the rear guard 100 can be constantly maintained or adjusted to a desired angle, depending on the length of the first stay link 220 or the hinge positions of both ends of the first stay link 220.

That is, although the rear guard 100 is raised, the angle of the face 110 of the rear guard 100 can be constantly maintained or adjusted to an angle desired by a designer. The guard stay 200 and the rear guard 100 are connected through the hinge, the first stay link 220 having the hinges installed at both ends thereof is installed, and the angle of the face 110 of the rear guard 100 can be constantly maintained or adjusted to a desired angle, depending on the length of the first stay link 220 and the hinge positions of both ends of the stay link 220.

Figure 9:
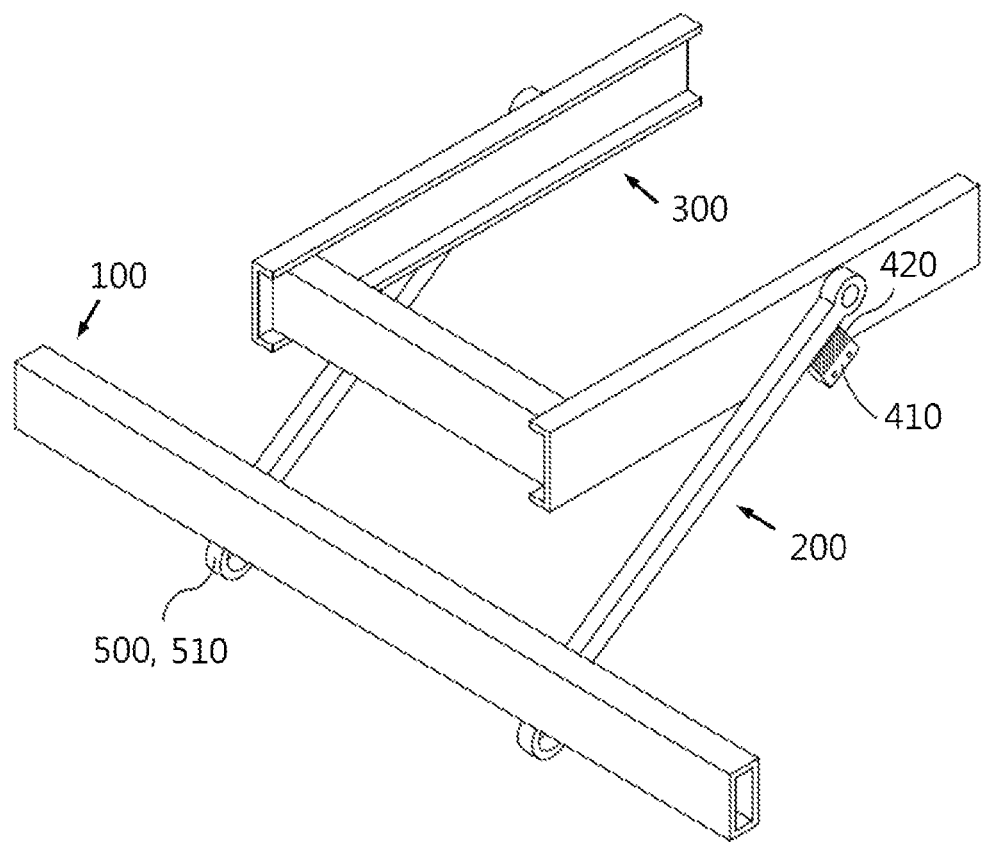
FIG. 9 is a perspective view illustrating a fourth structure according to the first embodiment, in which the structure system of the rear guard is installed on the chassis frame of the truck.
Figure 10:
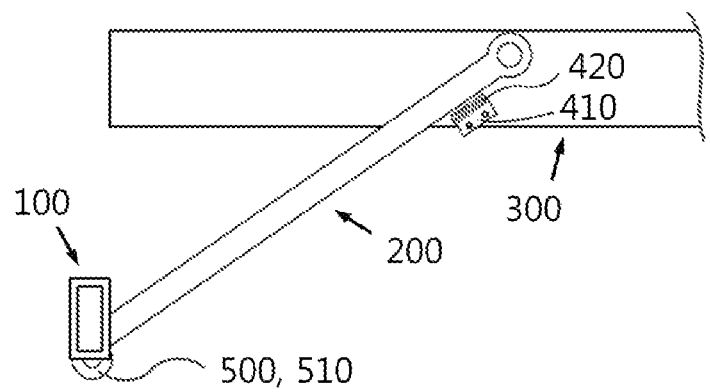
FIG. 10 is a side view illustrating the fourth structure according to the first embodiment, in which the structure system of the rear guard is installed on the chassis frame of the truck.
Figure 11:
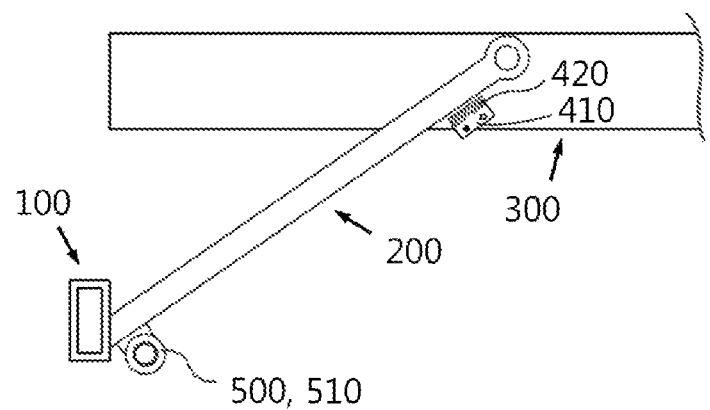
FIG. 11 is a side view illustrating a fifth structure according to the first embodiment, in which the structure system of the rear guard is installed on the chassis frame of the truck.

FIG. 9 is a perspective view illustrating a fourth structure according to the first embodiment, in which the structure system of the rear guard is installed on the chassis frame of the truck, FIG. 10 is a side view illustrating the fourth structure according to the first embodiment, in which the structure system of the rear guard is installed on the chassis frame of the truck, and FIG. 11 is a side view illustrating a fifth structure according to the first embodiment, in which the structure system of the rear guard is installed on the chassis frame of the truck.

Referring to FIGS. 9 to 11, the rear guard structure system according to the present embodiment includes a wheel 500 or sliding member 510 mounted on the rear guard 100 or the guard stay 200, in order to prevent damage which may be caused by friction when the rear guard 100 comes in contact with the ground.

That is, the wheel 500 or the sliding member 510 is mounted on the rear guard 100 or the guard stay 200, in order to prevent damage which may be caused by friction when the rear guard 100 comes in contact with the ground while driving. In this case, a stopper for restricting an upward/downward movement of the rear guard 100 is needed in order to constantly maintain the rear guard 100 positioned at the lowest point when the truck is driven.

Figure 12:
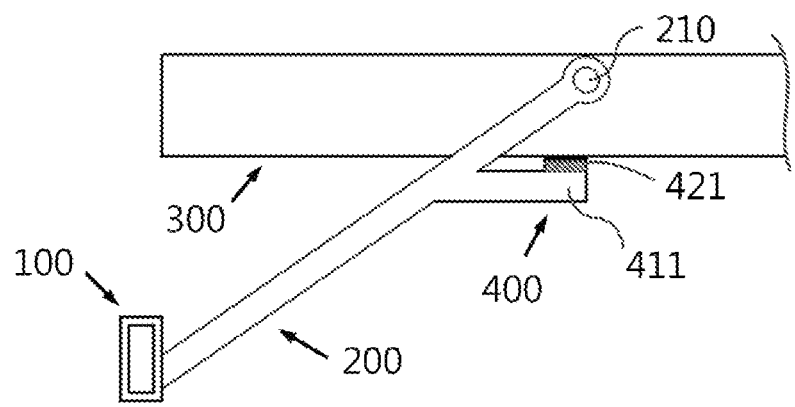
FIG. 12 is a side view illustrating a sixth structure according to the first embodiment, in which the structure system of the rear guard is installed on the chassis frame of the truck.

FIG. 12 is a side view illustrating a sixth structure according to the first embodiment, in which the structure system of the rear guard is installed on the chassis frame of the truck.

Referring to FIG. 12, the rear guard structure system according to the present embodiment has a second stopper 411 protruding from a predetermined region of the guard stay 200 in parallel to the chassis frame 300, and the second stopper 411 includes a second buffer member 421 for reducing friction with the chassis frame 300.

As such, the guard stay 200 can be modified in various shapes in order to avoid interference or absorb shock, and the shape of the stopper can be modified in various manners. The modifications can be checked through FIGS. 13 and 14.

Figure 13:
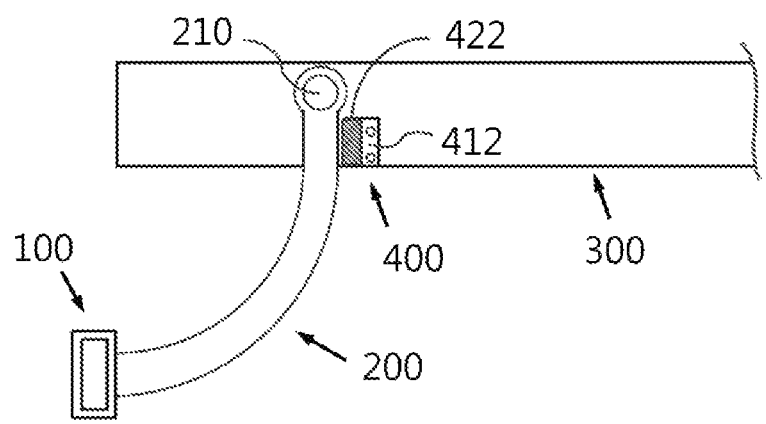
FIG. 13 is a side view illustrating a seventh structure according to the first embodiment, in which the structure system of the rear guard is installed on the chassis frame of the truck.

FIG. 13 is a side view illustrating a seventh structure according to the first embodiment, in which the rear guard structure system is installed on the chassis frame of the truck.

Referring to FIG. 13, the guard stay 200 included in the rear guard structure system according to the present embodiment is bent toward the front of the truck. The rear guard structure system according to the present embodiment includes a third stopper 412 installed on the chassis frame 300, the third stopper 412 having a third buffer member 422 for restricting rotation of the guard stay 200.

Figure 14:
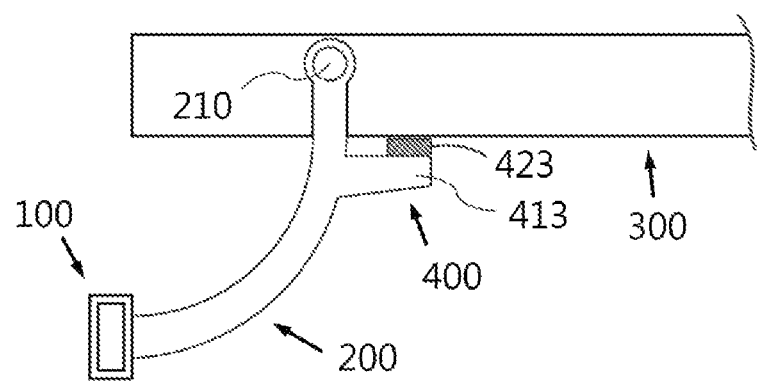
FIG. 14 is a side view illustrating an eighth structure according to the first embodiment, in which the structure system of the rear guard is installed on the chassis frame of the truck.

FIG. 14 is a side view illustrating an eighth structure according to the first embodiment, in which the structure system of the rear guard is installed on the chassis frame of the truck.

Referring to FIG. 14, the rear guard structure system according to the present embodiment has a fourth stopper 413 protruding from a predetermined region of the guard stay 200 in parallel to the chassis frame 300, and the fourth stopper 413 includes a fourth buffer member 423 for reducing friction with the chassis frame 300.

Figure 15:
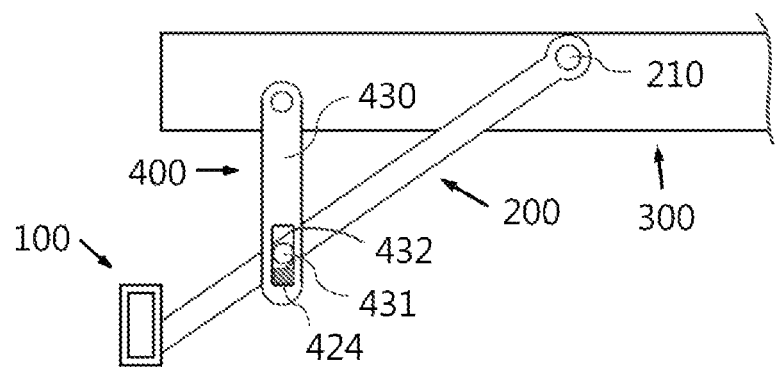
FIG. 15 is a side view illustrating a ninth structure according to the first embodiment, in which the structure system of the rear guard is installed on the chassis frame of the truck.

FIG. 15 is a side view illustrating a ninth structure according to the first embodiment, in which the structure system of the rear guard is installed on the chassis frame of the truck.

Referring to FIG. 15, the rear guard structure system according to the present embodiment further includes a sliding link 430 having one end hinge-coupled to the chassis frame 300 and the other end connected to the guard stay 200 through a sliding pin 431. The other end of the sliding link 430 has a first sliding guide 432 for guiding the sliding pin 431, and the first sliding guide 432 has a fifth buffer member 424 installed in one side thereof, the fifth buffer member 424 serving to restrict sliding of the sliding pin 431.

That is, the sliding pin 431 can be moved along the first sliding guide 432 of the sliding link 430, and the position of the sliding pin 431 can be controlled by adjusting the length of the first sliding guide 432. At this time, the fifth buffer member 424 may also be installed.

Figure 16:
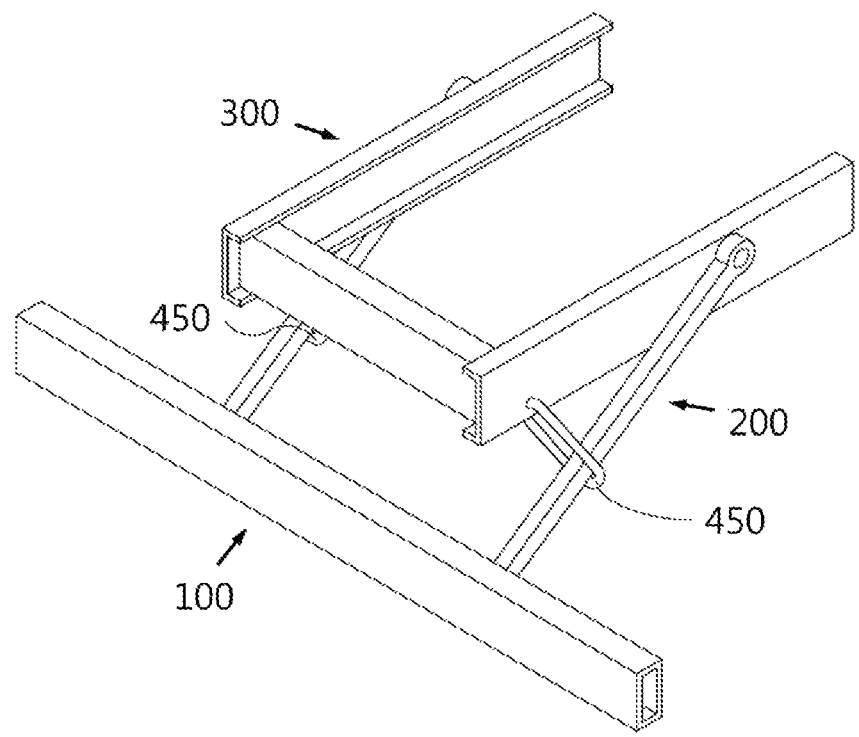
FIG. 16 is a perspective view illustrating a tenth structure according to the first embodiment, in which the structure system of the rear guard is installed on the chassis frame of the truck.

FIG. 16 is a perspective view illustrating a tenth structure according to the first embodiment, in which the rear guard structure system is installed on the chassis frame of the truck.

Referring to FIG. 16, the rear guard structure system according to the present embodiment includes: a first ring 450 formed in a circular or polygonal shape, the first ring 450 being connected through a side portion of the chassis frame 300 while surrounding the guard stay 200 and being formed of an elastic member which can be elastically deformed in the direction of weight; or a fifth stopper 410 installed at a portion of the first ring 450, which comes in contact with the guard stay 200, the fifth stopper 410 having a sixth buffer member 411.

That is, the first ring 450 having a circular or rectangular shape is installed on the chassis frame 300 while surrounding the guard stay 200. The lowest position of the rear guard 100 may be decided by the first ring 450, and the rear guard 100 can be moved only upward from the first ring 450. Moreover, the first ring 450 can be changed in various shapes. When the first ring 450 is formed of a material which can be elastically deformed in the weight direction of the guard stay 200, a buffering effect can be acquired through the elasticity of the first ring 450.

Figure 17:
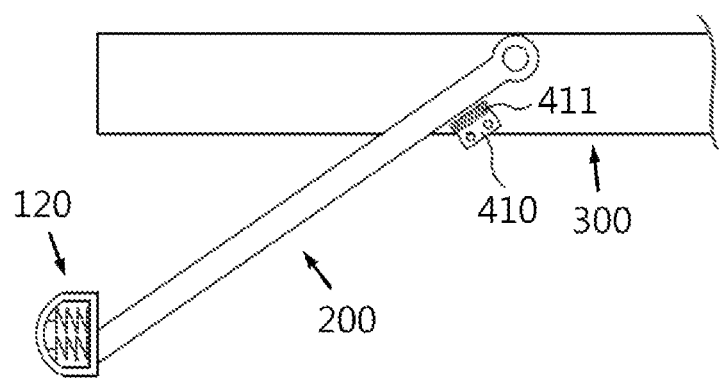
FIG. 17 is a side view illustrating an eleventh structure according to the first embodiment, in which the structure system of the rear guard is installed on the chassis frame of the truck.

FIG. 17 is a side view illustrating an eleventh structure according to the first embodiment, in which the rear guard structure system is installed on the chassis frame of the truck.

Referring to FIG. 17, the rear guard structure system according to the present embodiment has a structure in which the rear guard 100 includes an elastic member 120 capable of absorbing shock.

The rear guard 100 including the elastic member 120 for absorbing shock may have various shapes and structures. The shapes and structures can be checked with reference to FIG. 18.

Figure 18:
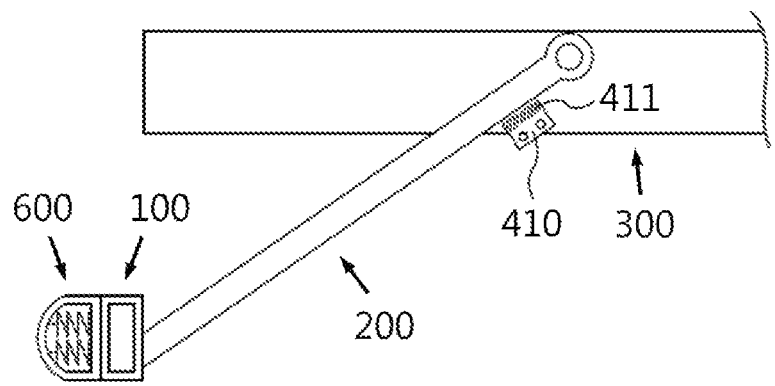
FIG. 18 is a side view illustrating a twelfth structure according to the first embodiment, in which the structure system of the rear guard is installed on the chassis frame of the truck.

FIG. 18 is a side view illustrating a twelfth structure according to the first embodiment, in which the rear guard structure system is installed on the chassis frame of the truck.

Referring to FIG. 18, the rear guard structure system according to the present embodiment has a structure in which the rear guard 100 includes an elastic member 600 installed on the face 110 thereof, the elastic member 600 being capable of absorbing shock.

Figure 19:
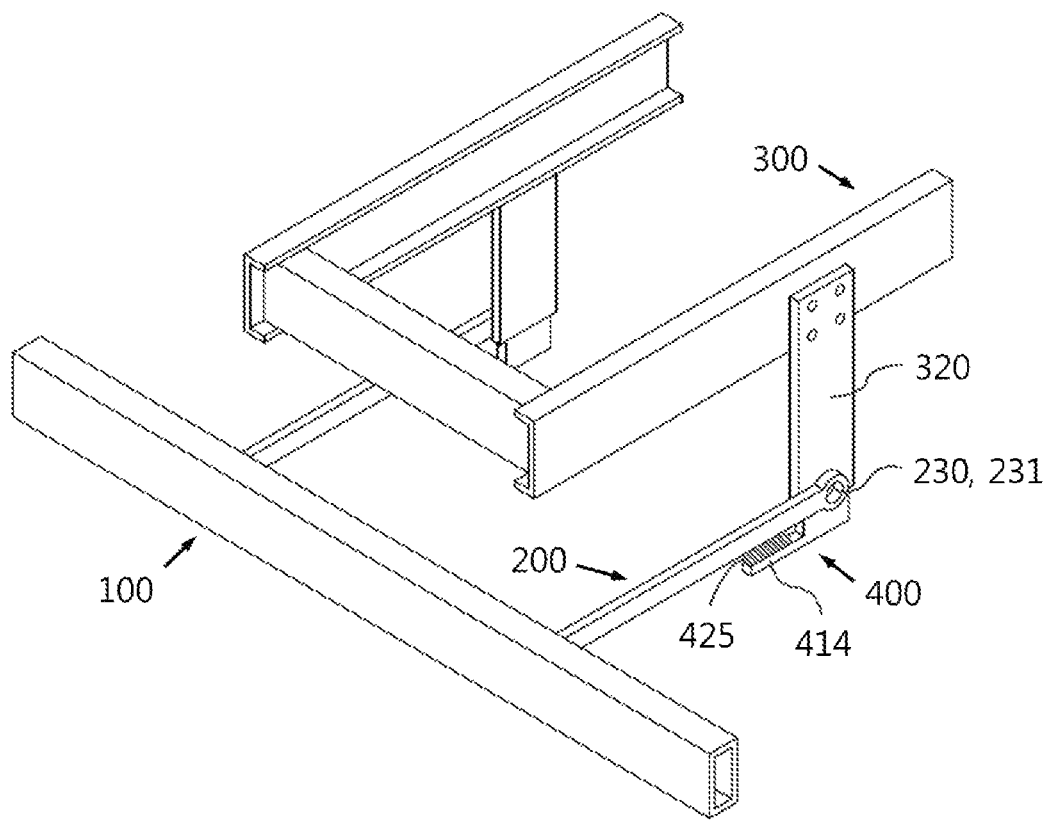
FIG. 19 is a perspective view illustrating a first structure according to a second embodiment, in which a structure system of a rear guard is installed on a chassis frame of a truck.
Figure 20:
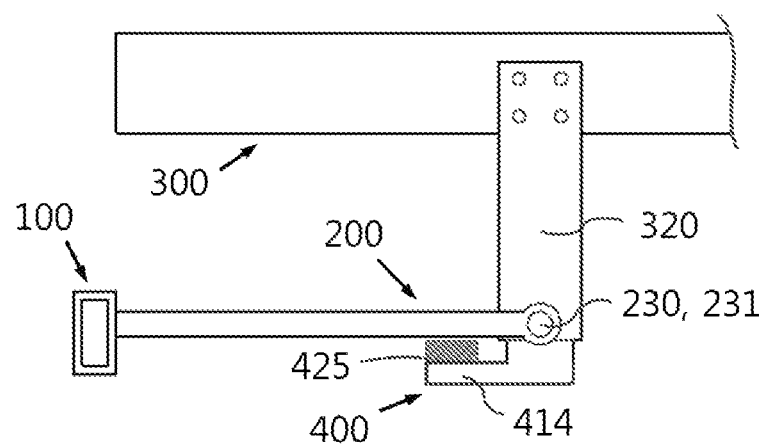
FIG. 20 is a side view illustrating the first structure according to the second embodiment, in which the structure system of the rear guard is installed on the chassis frame of the truck.

FIG. 19 is a perspective view illustrating a first structure according to a second embodiment, in which a structure system of a rear guard is installed on a chassis frame of a truck, and FIG. 20 is a side view illustrating the first structure according to the second embodiment, in which the structure system of the rear guard is installed on the chassis frame of the truck.

Referring to FIG. 19, the rear guard structure system according to the present embodiment includes a chassis frame 300, a plurality of hinge brackets 320, a plurality of guard stays 200 and a rear guard 100. The chassis frame 300 is attached to the bottom of the truck, the plurality of hinge brackets 320 have one ends hinge-coupled to both sides of the chassis frame 300 and the other ends hinge-coupled to the guard stays 200 through fifth hinges 230, the plurality of guard stays 200 have sixth hinges 231 installed at one ends thereof, the sixth hinges 231 being hinge-coupled to the fifth hinges 230 installed at the other ends of the hinge brackets 320, and the rear guard 100 is attached to the other ends of the guard stays 200.

The rear guard structure system according to the present embodiment includes an L-shaped sixth stopper 414 having one end hinge-coupled to the other end of the hinge bracket 320 through the fifth and sixth hinges 230 and 231, and the sixth stopper 414 serves to restrict rotation of the guard stay 200, and includes a seventh buffer member 425 installed at the other end thereof, the seventh buffer member 425 serving to reduce shock and vibration when the rear guard 100 is vertically vibrated.

That is, the rear guard structure system according to the invention uses the fifth hinges 230 of the hinge brackets 320 and the sixth hinges 231 of the guard stays 200. Even at this time, various shapes of guard stays 200 and stoppers can be applied.

Figure 21:
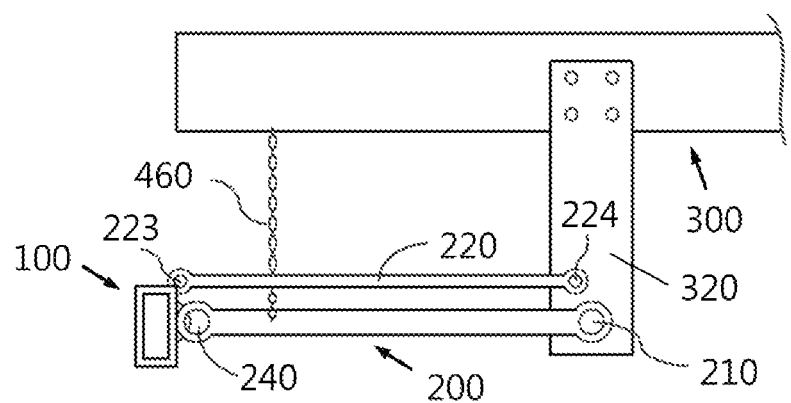
FIG. 21 is a side view illustrating a second structure according to the second embodiment, in which the structure system of the rear guard is installed on the chassis frame of the truck.

FIG. 21 is a side view illustrating a second structure according to the second embodiment, in which the rear guard structure system is installed on the chassis frame of the truck.

Referring to FIG. 21, the rear guard structure system according to the present embodiment further includes a second stay link 220 having one end connected to the rear guard 100 through a seventh hinge 223 and the other end connected to the hinge bracket 320 through an eighth hinge 224. The rear guard 100 is hinge-coupled to the other end of the guard stay 200 through a ninth hinge 240, and the face 110 of the rear guard 100 can be constantly maintained or adjusted to a desired angle, depending on the length of the second stay link 220 or the hinge positions of both ends of the second stay link 220.

That is, the guard stay 200 and the rear guard 100 are connected through the hinge, the second stay link 220 having the hinges installed at both ends thereof is installed, and the angle of the face 110 of the rear guard 100 can be constantly maintained or adjusted to a desired angle, depending on the length of the second stay link 220 and the hinge positions of both ends of the second stay link 220.

Figure 22:
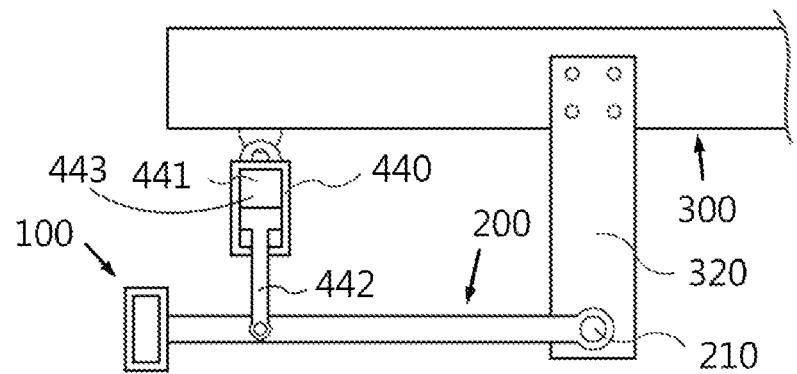
FIG. 22 is a side view illustrating a third structure according to the second embodiment, in which the structure system of the rear guard is installed on the chassis frame of the truck.

FIG. 22 is a side view illustrating a third structure according to the second embodiment, in which the structure system of the rear guard is installed on the chassis frame of the truck.

Referring to FIG. 22, the rear guard structure system according to the present embodiment further includes a first piston stopper 440 having one end coupled to the chassis frame 300 and the other end connected to the guard stay 200 through a piston 442. The first piston stopper 440 has a second sliding guide 443 formed at the other end thereof, the second sliding guide 443 serving to guide a piston operation of the piston 442, and the second sliding guide 443 includes a damper fluid 441 to fill the inside thereof.

That is, the first piston stopper 440 is filled with the damper fluid such as gas or oil to serve as a damper. Therefore, when the truck is driven or the rear guard 100 is raised and then lowered, the first piston stopper 440 can prevent vibration and shock. Even when a stopper having a different shape is used, such a damper can be installed to reduce vibration of the rear guard 100.

Figure 23:
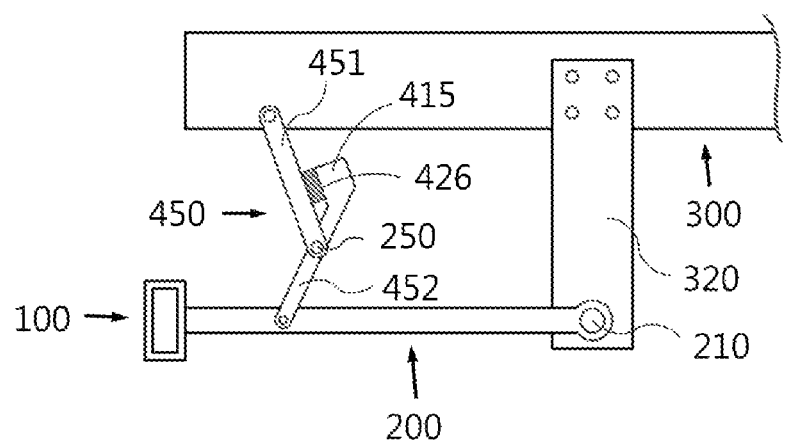
FIG. 23 is a side view illustrating a fourth structure according to the second embodiment, in which the structure system of the rear guard is installed on the chassis frame of the truck.

FIG. 23 is a side view illustrating a fourth structure according to the second embodiment, in which the rear guard structure system is installed on the chassis frame of the truck.

Referring to FIG. 23, the rear guard structure system according to the present embodiment further includes a third stay link 451 and a fourth stay link 452. The third stay link 451 has one end hinge-coupled to the chassis frame 300, and the fourth stay link 452 has one end hinge-coupled to the guard stay 200 and the bent other end. The other end of the third stay link 451 is hinge-coupled to the fourth stay link 452 through a tenth hinge 250, such that a rotation angle between the third and fourth stay links 451 and 452 based on an upward/downward movement of the rear guard 100 is larger than a rotation angle between the guard stay 200 and the fourth stay link 452. Between the other end of the fourth stay link 452 and the third stay link 451, an eighth buffer member 426 is installed.

That is, the rear guard structure system includes two links 451 and 452 and one hinge 250, and can easily perform angle control because the rotation angle between the two links 451 and 452 based on an upward/downward movement of the rear guard 100 is larger than the rotation angle at the hinge of the guard stay 200.

Figure 24:
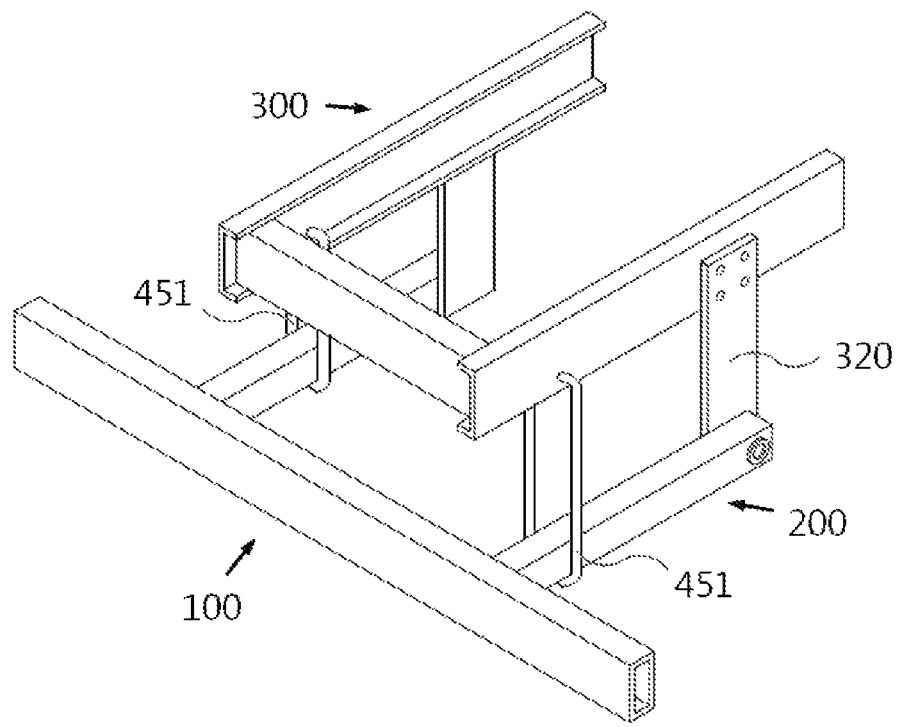
FIG. 24 is a perspective view illustrating a fifth structure according to the second embodiment, in which the structure system of the rear guard is installed on the chassis frame of the truck.
Figure 25:
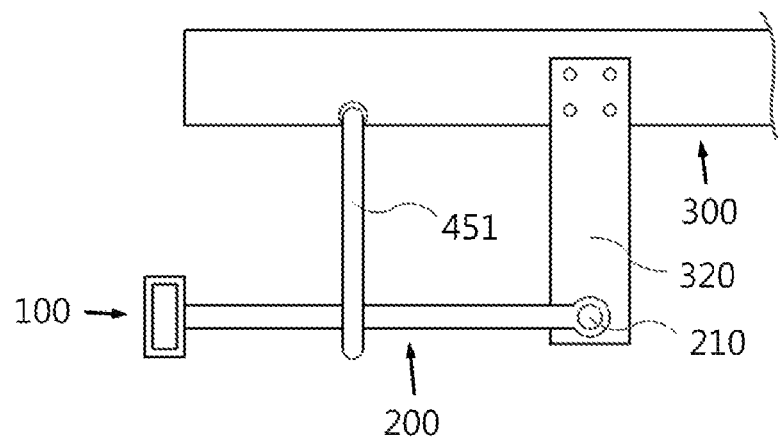
FIG. 25 is a side view illustrating the fifth structure according to the second embodiment, in which the structure system of the rear guard is installed on the chassis frame of the truck.
Figure 26:
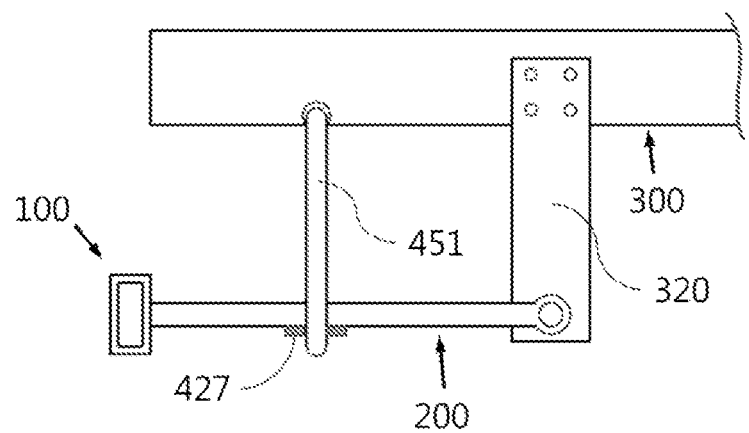
FIG. 26 is a side view illustrating a sixth structure according to the second embodiment, in which the structure system of the rear guard is installed on the chassis frame of the truck.
Figure 27:
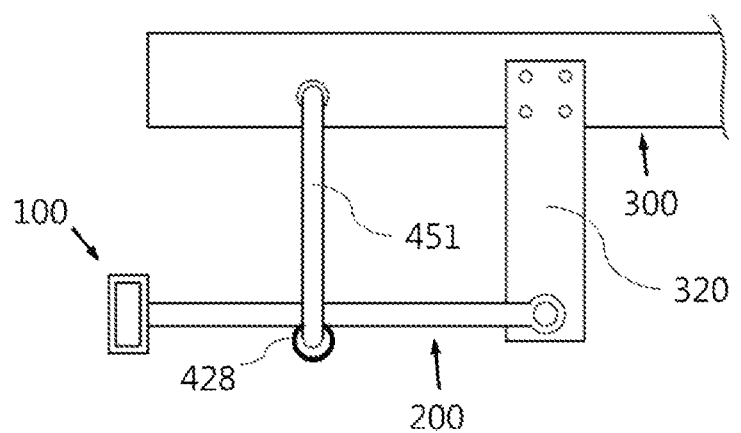
FIG. 27 is a side view illustrating a seventh structure according to the second embodiment, in which the structure system of the rear guard is installed on the chassis frame of the truck.

FIG. 24 is a perspective view illustrating a fifth structure according to the second embodiment, in which the structure system of the rear guard is installed on the chassis frame of the truck, FIG. 25 is a side view illustrating the fifth structure according to the second embodiment, in which the structure system of the rear guard is installed on the chassis frame of the truck, FIG. 26 is a side view illustrating a sixth structure according to the second embodiment, in which the structure system of the rear guard is installed on the chassis frame of the truck, and FIG. 27 is a side view illustrating a seventh structure according to the second embodiment, in which the structure system of the rear guard is installed on the chassis frame of the truck.

Referring to FIGS. 24 to 27, the rear guard structure system according to the present embodiment includes a second ring 451 formed in a circular or polygonal shape, the second ring 451 being connected through a side portion of the chassis frame 300 while surrounding the guard stay 200. The second ring 451 is formed of an elastic member which can be elastically deformed in the direction of weight, or has a ninth buffer member 427 installed at a portion of the second ring 451, which comes in contact with the guard stay 200, or a buffer ring 428 inserted into the portion of the second ring 451, which comes in contact with the guard stay 200.

That is, FIG. 24 illustrates an example in which the second ring 451 is formed of an elastic material which can be elastically deformed, FIG. 25 illustrates an example in which the ninth buffer member 427 is installed at the contact portion between the second ring 451 and the guard stay 200, and FIG. 26 illustrates an example in which the buffer ring 428 is installed at the contact portion between the second ring 451 and the guard stay 200.

Figure 28:
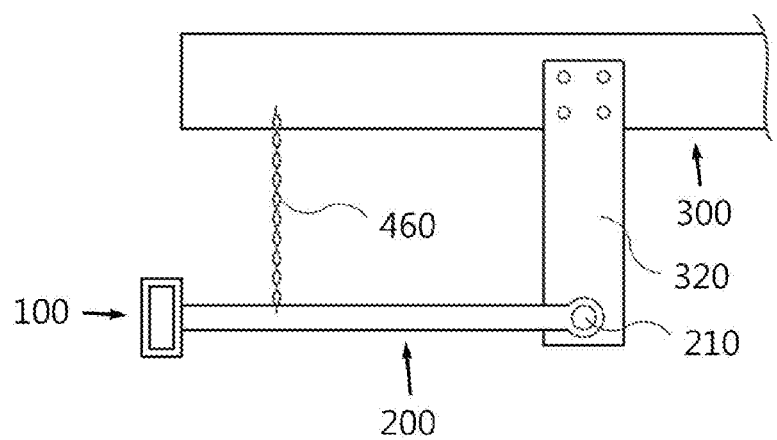
FIG. 28 is a side view illustrating an eighth structure according to the second embodiment, in which the structure system of the rear guard is installed on the chassis frame of the truck.

FIG. 28 is a side view illustrating an eighth structure according to the second embodiment, in which the rear guard structure system is installed on the chassis frame of the truck.

Referring to FIG. 28, the rear guard structure system according to the present embodiment has a structure in which the chassis frame 300 and the guard stay 200 are connected through a wire or chain 460.

The wire or chain 460 supports a tensile load, but cannot support a compressive load due to buckling. When the wire or chain 460 is used, the lowest position of the rear guard 100 can be decided by the length of the wire or chain 460. The wire or chain 460 can serve as a stopper which controls the rear guard 100 to move only upward from the wire or chain 460.

Figure 29:
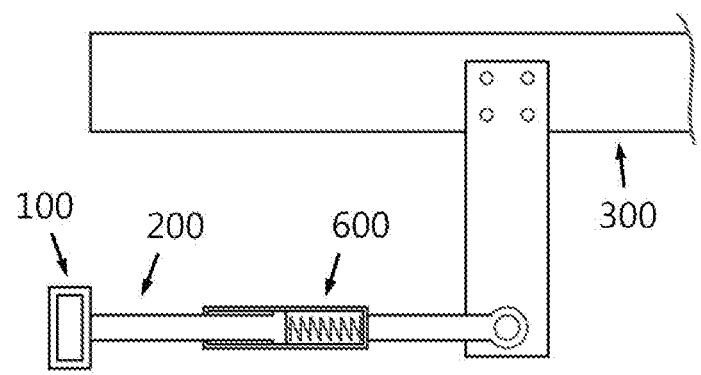
FIG. 29 is a side view illustrating a ninth structure according to the second embodiment, in which the structure system of the rear guard is installed on the chassis frame of the truck.

FIG. 29 is a side view illustrating a ninth structure according to the second embodiment, in which the structure system of the rear guard is installed on the chassis frame of the truck.

Referring to FIG. 29, the guard stay 200 in the rear guard structure system according to the present embodiment further include a shock absorbing member 600 capable of absorbing shock.

The shock absorbing member 600 capable of absorbing shock may have various shapes and structures.

Figure 30:
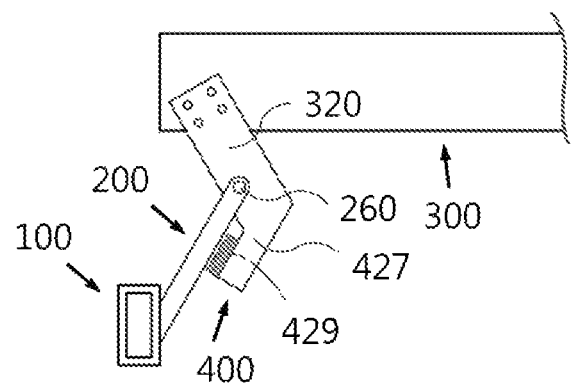
FIG. 30 is a side view illustrating a structure according to a third embodiment, in which a structure system of a rear guard is installed on a chassis frame of a truck.

FIG. 30 is a side view illustrating a structure according to a third embodiment, in which a rear guard structure system is installed on a chassis frame of a truck.

Referring to FIG. 30, the rear guard structure system according to the present embodiment includes a chassis frame 300, a plurality of hinge brackets 320, a plurality of guard stays 200, and a rear guard 100. The chassis frame 300 is attached to the bottom of the truck, the plurality of hinge brackets 320 have one ends coupled to both sides of the chassis frame 300 and the bent other ends, the plurality of guard stays 200 have one ends hinge-coupled to straight portions of the hinge brackets 320 through eleventh hinges 260, and the rear guard 100 is attached to the other ends of the guard stays 200. Between the guard stay 200 and the other end of the hinge bracket 320, a tenth buffer member 429 is installed.

The rear guard 100, the guard stay 200 or the hinge bracket 320 can be modified in various shapes, and various shapes of stoppers can be installed. The stopper structures described in the above embodiments are irrelevant to the presence of the hinge bracket 320.

That is, when a rear end collision occurs, the stopper 400 and the buffer member 429 installed on the stopper 400 can absorb a part of shock, and the rear guard 100, the rear guard face 110 and the guard stay 200 can absorb another part of the shock. In addition, when the rear guard 100 or the guard stay 200 is designed to collapse while absorbing shock, the shock can be effectively reduced. Furthermore, when a shock absorbing device for absorbing shock is attached, the shock absorbing device can reduce the shock, thereby contributing to the safety of a rear-ending vehicle.

Figure 31:
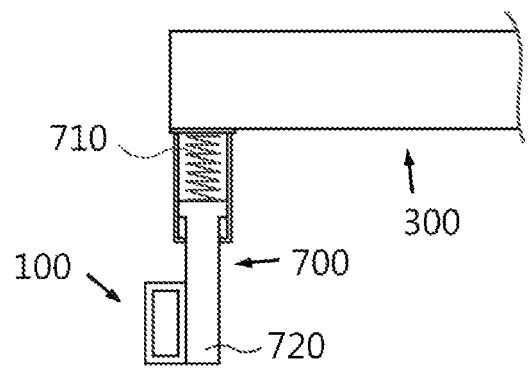
FIG. 31 is a side view illustrating a first structure according to a fourth embodiment, in which a structure system of a rear guard is installed on a chassis frame of a truck.

FIG. 31 is a side view illustrating a first structure according to a fourth embodiment, in which a rear guard structure system is installed on a chassis frame of a truck.

Referring to FIG. 31, the rear guard structure system according to the present embodiment includes a chassis frame 300 attached to the bottom of the truck and a second piston stopper 700 having one end coupled to the chassis frame 300 and the other end coupled to the rear guard 100 through a piston 720.

The structure system of the rear guard further includes an elastic member 710 between the one end of the second piston stopper 700 and the piston 720.

That is, the structure system of the rear guard includes the second piston stopper 700 using a piston with an adjustable length, instead of the guard stay 200. In the present embodiment, the rear guard 100 is not rotated about the hinges, but moved up and down in a sliding manner using a piston, and the piston 720 may be formed in a square pillar shape, a cylindrical shape or a partially opened square pillar shape. In the present embodiment, the one end of the second piston stopper 700 is fixed to the chassis frame 300, and the other end of the second piston stopper 700 is fixed to the rear guard 100 such that the rear guard 100 can moved upward and downward. In normal operations, the rear guard 100 is positioned at the lowest position by the weight thereof or the force of the elastic member 710.

Figure 32:
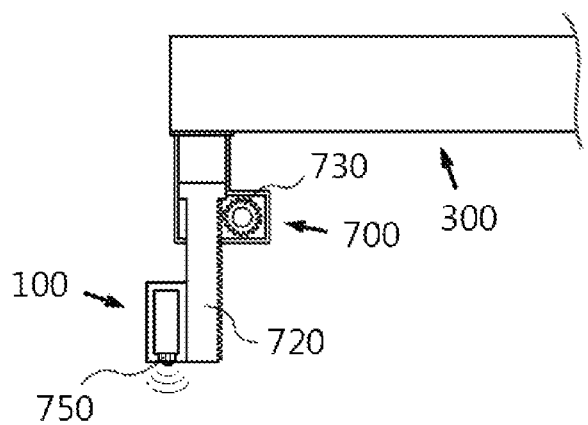
FIG. 32 is a side view illustrating a second structure according to the fourth embodiment, in which the structure system of the rear guard is installed on the chassis frame of the truck.
Figure 33:
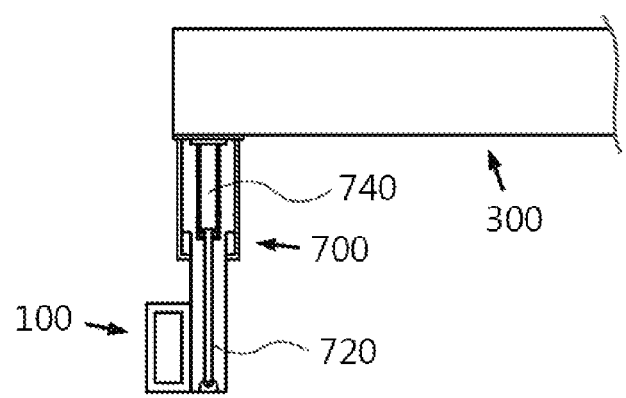
FIG. 33 is a side view illustrating a third structure according to the fourth embodiment, in which the structure system of the rear guard is installed on the chassis frame of the truck.

FIG. 32 is a side view illustrating a second structure according to the fourth embodiment, in which the structure system of the rear guard is installed on the chassis frame of the truck, and FIG. 33 is a side view illustrating a third structure according to the fourth embodiment, in which the structure system of the rear guard is installed on the chassis frame of the truck.

Referring to FIGS. 32 and 33, the rear guard structure system according to the present embodiment includes a power-driven device 730 or hydraulic device 740 installed between one end of the second piston stopper 700 and the piston 720, and raises or lowers the piston 720, if necessary.

When the power-driven device 730 is installed between the one end of the second piston stopper 700 and the piston 720, the piston 720 is raised or lowered through gear engagement between the outer surface of the power-driven device 730 and the outer surface of the piston 720. Furthermore, when the hydraulic device 740 is installed between one end of the second piston stopper 700 and the piston 720, the piston 720 is raised or lowered by hydraulic pressure of the hydraulic device 740.

The rear guard structure system further includes a first distance sensor 750 installed at the other end of the second piston stopper 700 and configured to measure a distance to the ground, such that the piston 720 is automatically raised when the rear guard 100 is close to the ground.

Figure 34:
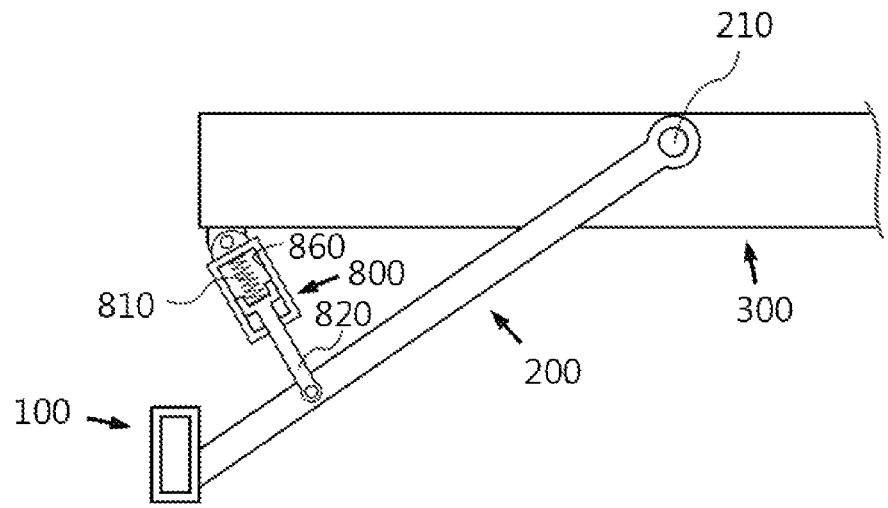
FIG. 34 is a side view illustrating a thirteenth structure according to the first embodiment, in which the structure system of the rear guard is installed on the chassis frame of the truck.

FIG. 34 is a side view illustrating a thirteenth structure according to the first embodiment, in which the structure system of the rear guard is installed on the chassis frame of the truck.

Referring to FIG. 34, the rear guard structure system according to the present embodiment further includes a third piston stopper 800 having one end coupled to the chassis frame 300 and the other end connected to the guard stay 200 through a piston 820. The third piston stopper 800 has a third sliding guide 860 formed at the other end thereof so as to guide a piston operation of the piston 820, and the third sliding guide 860 is filled with air or damper fluid.

The third sliding guide 860 further includes an elastic member 810 installed therein.

Figure 35:
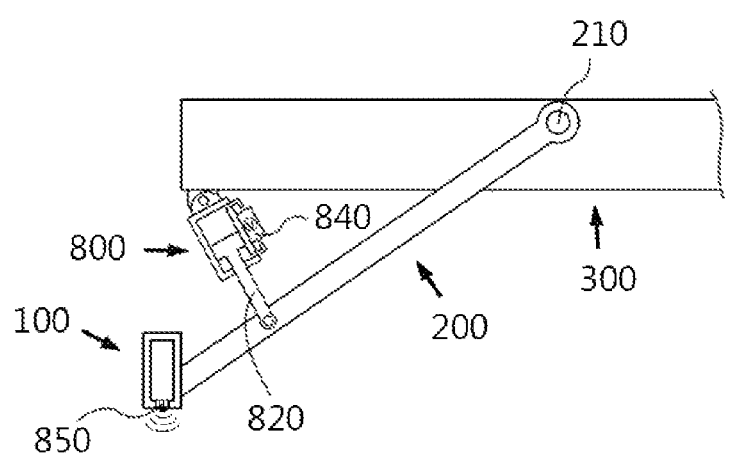
FIG. 35 is a side view illustrating a fourteenth structure according to the first embodiment, in which the structure system of the rear guard is installed on the chassis frame of the truck.
Figure 36:
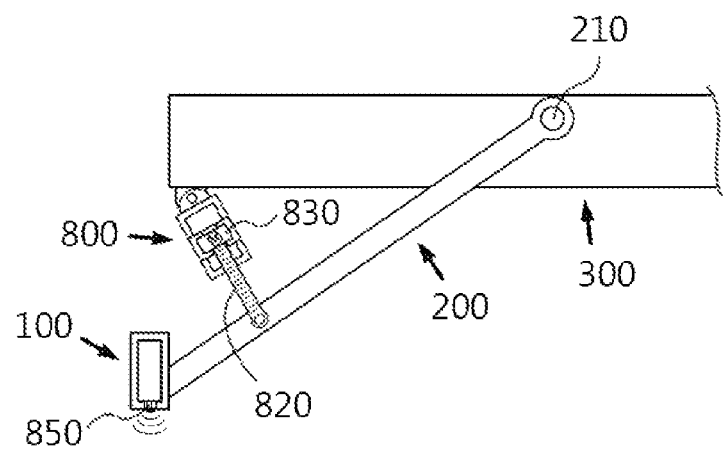
FIG. 36 is a side view illustrating a fifteenth structure according to the first embodiment, in which the structure system of the rear guard is installed on the chassis frame of the truck.

FIG. 35 is a side view illustrating a 14th structure according to the first embodiment, in which the structure system of the rear guard is installed on the chassis frame of the truck, and FIG. 36 is a side view illustrating a 15th structure according to the first embodiment, in which the structure system of the rear guard is installed on the chassis frame of the truck.

Referring to FIGS. 35 and 36, the rear guard structure system according to the present embodiment further includes a power-driven device 830 or hydraulic device 840 in the third sliding guide 860, and raises or lowers the piston 820, if necessary.

The rear guard structure system further includes a second distance sensor 850 installed at the other end of the third piston stopper 800 and configured to measure a distance to the ground, such that the piston 820 is automatically raised when the rear guard 100 is close to the ground.

Figure 37:
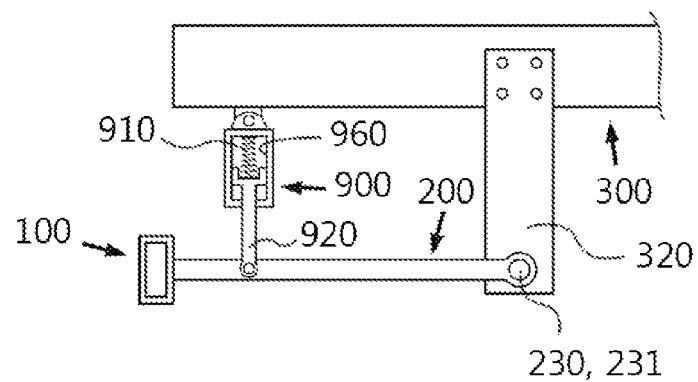
FIG. 37 is a side view illustrating a tenth structure according to the second embodiment, in which the structure system of the rear guard is installed on the chassis frame of the truck.

FIG. 37 is a side view illustrating a tenth structure according to the second embodiment, in which the structure system of the rear guard is installed on the chassis frame of the truck.

Referring to FIG. 37, the rear guard structure system according to the present embodiment further includes a second sliding guide 960 having an elastic member 910 installed therein.

Figure 38:
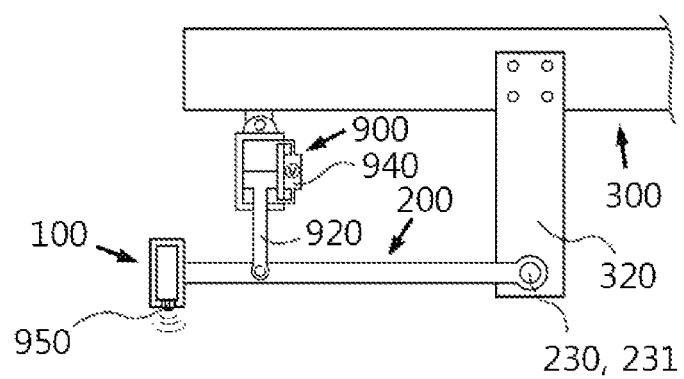
FIG. 38 is a side view illustrating an eleventh structure according to the second embodiment, in which the structure system of the rear guard is installed on the chassis frame of the truck.
Figure 39:
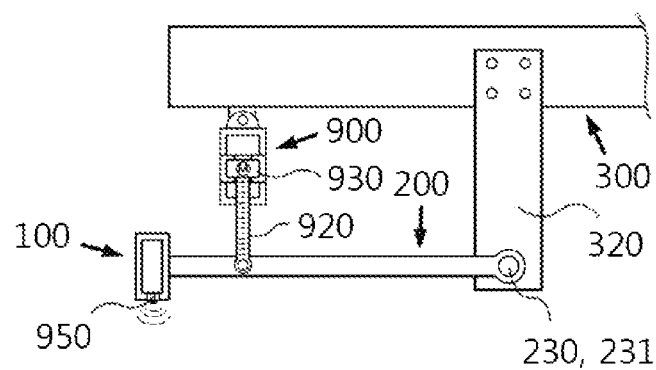
FIG. 39 is a side view illustrating a twelfth structure according to the second embodiment, in which the structure system of the rear guard is installed on the chassis frame of the truck.

FIG. 38 is a side view illustrating an eleventh structure according to the second embodiment, in which the structure system of the rear guard is installed on the chassis frame of the truck, and FIG. 39 is a side view illustrating a twelfth structure according to the second embodiment, in which the structure system of the rear guard is installed on the chassis frame of the truck.

Referring to FIGS. 38 and 39, the rear guard structure system according to the present embodiment further includes a power-driven device 930 or hydraulic device 940 in the second sliding guide 960, and raises or lowers the piston 920, if necessary.

The rear guard structure system further includes a third distance sensor 950 installed at the other end of a fourth piston stopper 900 and configured to measure a distance to the ground, such that the piston 920 is automatically raised when the rear guard 100 is close to the ground.

As such, the present disclosure relates to the rear guard 100 for a truck, which can move upward and downward. The rear guard 100 can be installed at a low level. When a vehicle collides with the rear guard 100, the rear guard 100 is not moved in the collision direction, thereby reliably playing its role. Furthermore, since the rear guard 100 can be moved upward/downward, damage of the rear guard 100 can be prevented even though the rear guard 100 comes in contact with the ground when the truck moves up and down a steep ramp.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rear guard structure system comprising:
a chassis frame attached to a bottom of a vehicle;
a plurality of guard stays having one ends thereof hinge-coupled to chassis-frame hinges at both sides of the chassis frame through first hinges;
a rear guard attached to the other ends of the guard stays; and
a first stopper mounted around the first hinge, and configured to support a part of lower surface of the guard stay so as to restrict rotation of the guard stay,
wherein the rear guard is positioned at a lowest point set by the first stopper and is operated only upward from the first stopper so that the first stopper contacts the part of lower surface of the guard stay when the rear guard is at the lowest point and the first stopper is spaced apart from the guard stay when the rear guard is operated upward, and
the first stopper includes a first buffer member to reduce shock or vibration when the rear guard is vertically vibrated.

2. The rear guard structure system according to claim 1, wherein when the rear guard is attached to the other ends of the guard stays, a face of the rear guard has an angle of 90 degrees or more with respect to the ground.

3. The rear guard structure system according to claim 1, further comprising:
a first stay link having one end connected to the rear guard through a second hinge and the other end connected to the chassis frame through a third hinge,
wherein the rear guard is hinge-coupled to the other end of the guard stay through a fourth hinge, and
a face angle of the guard stay is constantly maintained or adjusted to a desired angle, depending on the length of the first stay link or the hinge positions of both ends of the first stay link.

4. The rear guard structure system according to claim 1, further comprising:
a wheel or sliding member mounted on the rear guard or the guard stay, in order to prevent damage caused by friction when the rear guard comes in contact with the ground.

5. The rear guard structure system according to claim 1, wherein
the guard stay has a second stopper protruding from a predetermined region thereof in parallel to the chassis frame, and
the second stopper includes a second buffer member for reducing friction with the chassis frame.

6. The rear guard structure system according to claim 1, wherein the guard stay is bent toward the front of the vehicle.

7. The rear guard structure system according to claim 6, further comprising:
a third stopper installed on the chassis frame, the third stopper having a third buffer member for restricting rotation of the guard stay.

8. The rear guard structure system according to claim 6, wherein
the guard stay has a fourth stopper protruding from a predetermined region thereof in parallel to the chassis frame, and
the fourth stopper includes a fourth buffer member for reducing friction with the chassis frame.

9. The rear guard structure system according to claim 1, further comprising:
a sliding link having one end hinge-coupled to the chassis frame and the other end connected to the guard stay through a sliding pin,
wherein the sliding link has a first sliding guide installed at the other end thereof, the first sliding guide serving to guide the sliding pin, and
the first sliding guide has a fifth buffer member installed in one side thereof, the fifth buffer member serving to restrict sliding of the sliding pin.

10. The rear guard structure system according to claim 1, further comprising:
a circular or polygonal first ring connected through a side portion of the chassis frame, while surrounding the guard stay, the first ring being formed of an elastic material which is elastically deformed in a direction of weight; and
a fifth stopper having a sixth buffer member installed at a portion of the first ring, which comes in contact with the guard stay.

11. The rear guard structure system according to claim 1, wherein the guard stay includes a shock absorbing member installed therein so as to absorb shock.

12. The rear guard structure system according to claim 1, wherein the guard stay includes a shock absorbing member installed at the face thereof so as to absorb shock.

13. The rear guard structure system according to claim 1, further comprising:
a third piston stopper having one end coupled to the chassis frame and the other end connected to the guard stay through a piston,
wherein the third piston stopper has a third sliding guide installed at the other end thereof so as to guide a piston operation of the piston, and
the third sliding guide is filled with air or damper fluid.

14. The rear guard structure system according to claim 13, further comprising:
an elastic member installed in the third sliding guide.

15. The rear guard structure system according to claim 13, further comprising:
a power-driven device or hydraulic device installed in the third sliding guide, and configured to raise or lower the piston, if necessary.

16. The rear guard structure system according to claim 13, further comprising:
a second distance sensor installed at the other end of the third piston stopper and configured to measure a distance to the ground, such that the piston is automatically raised when the rear guard is close to the ground.

* * * * *